June 4, 1940. B. A. STUART 2,203,551
LAWN MOWER SHARPENING TOOL
Filed Sept. 13, 1938
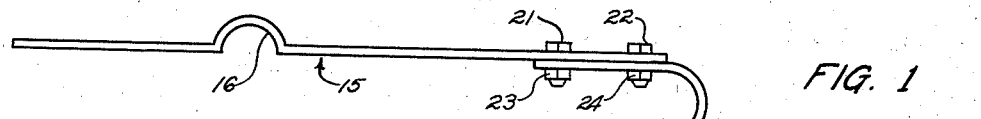
FIG. 1
FIG. 2
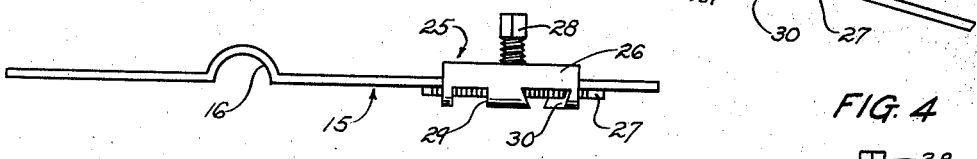
FIG. 3
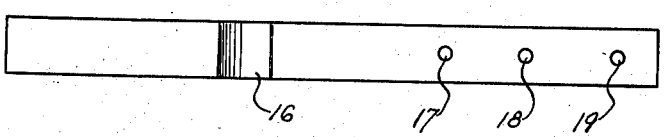
FIG. 4
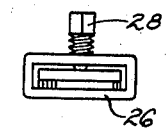
FIG. 5
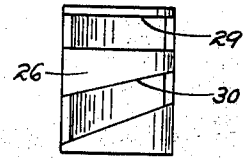
FIG. 6   FIG. 7
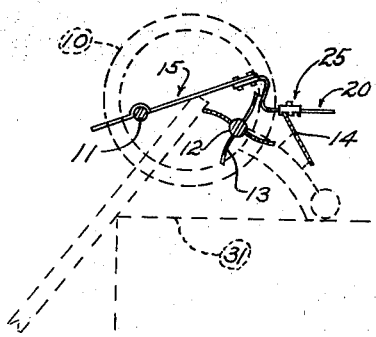
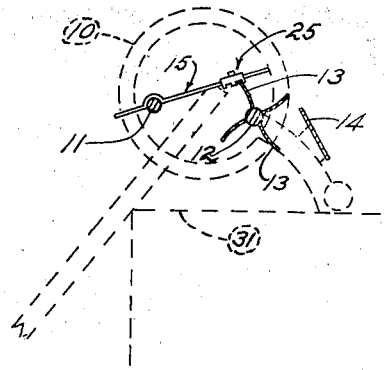
BILL A. STUART
INVENTOR.
BY Hubert Miller
ATTORNEY.

Patented June 4, 1940

2,203,551

UNITED STATES PATENT OFFICE 2,203,551

LAWN MOWER SHARPENING TOOL

Bill A. Stuart, Arkansas City, Kans.

Application September 13, 1938, Serial No. 229,646

1 Claim. (Cl. 76—82.1)

This invention relates to a tool for sharpening lawn mowers.

The chief object of the invention is to provide a device of this class which not only enables an operator to sharpen the cutter blades without removing them from the reel and without removing the reel from the mower, but also enables one to sharpen the bottom stationary knife without removing it from the mower, and without changing its normal relation with the moving cutter blades.

A further object of this invention is to provide a tool of this kind which can be adjusted to fit any type of lawn mower.

The details in the construction of a preferred form of my invention, together with other objects attending its production, will be better understood from the following description when read in connection with the accompanying drawing, which is chosen for illustrative purposes only, and in which:

Figure 1 is a side view of the completely assembled tool;

Figure 2 is a view similar to Figure 1, but with the extension arm omitted;

Figure 3 is a plan view of that portion of the device shown in Figure 2, with the file holding clamp omitted;

Figure 4 is an end view of the file holding clamp;

Figure 5 is a bottom view of the file holding clamp showing the cross slots cut in its bottom wall;

Figure 6 is a side view of the tool in operative position on a lawn mower (certain parts of the mower being shown in section and other parts in dotted lines), and illustrates particularly the manner in which the stationary knife blade of the mower is sharpened by the tool;

Figure 7 is a view similar to Figure 6 but illustrates particularly the manner of sharpening the revolving blades of the mower.

Referring now to the drawing in detail, numeral 10 designates a lawn mower as a whole, 11 is a cross bar which is rigidly secured between the side frames of the mower, 12 is the reel which carries the revolving cutter blades 13, and 14 is the stationary blade which contacts the cutting edges of the blades 13 as they move with the reel.

The tool proper comprises a guide arm 15 made of a single piece of strap iron and provided with an arched portion 16 for slidably seating on the cross bar 11 of the mower. Near one of its ends the guide arm 15 is provided with a plurality of equally spaced bolt holes 17, 18, and 19 which make possible the adjustable connection of a substantially S-shaped extension arm 20 to the guide arm 15 (as shown in Figs. 1 and 6) by means of bolts 21 and 22 and nuts 23 and 24, which pass through two identically spaced holes near one end of said extension arm. The extension arm 20 is made from a single piece of strap iron of the same cross sectional area and shape as the strap iron from which the arm 15 is made. This is preferable so that a file holding clamp, designated as a whole by the numeral 25 may be interchangeably secured in a selected position either on one end of the extension arm 20, as shown in Figures 1 and 6, or on one end of the guide arm 15, as shown in Figures 2 and 7.

The file holding clamp 25 comprises a hollow body 26, which is rectangular in cross section and open at both ends. Its interior is only slightly greater in length than the width of the arms 15 and 20, and sufficiently wide to slidably receive an end of either of said arms together with a file 27 for holding the two flat against each other, as clearly shown in Figure 2. One wall of the body 26 is provided with a threaded perforation to receive a set screw 28, the inner end of which is adapted to press against the adjacent surface of the arm, forcing it firmly against the file, and forcing the file flat against the opposite side wall of the body, thus rigidly positioning the two with relation to each other and also rigidly but adjustably securing the file clamp to the arm.

This last mentioned side wall of the body 26 is provided with a plurality of cross slots, at least one of which, 29, is at right angles to the longitudinal axis of said body 26, and another of which, 30, is at an angle greater than right angles thereto. The ends of these slots cut through the two opposite edge walls of said body so as to make an unobstructed runway or passage through the slots. These slots are for the purpose of exposing a portion of the nether surface of the file 27 to a blade to be sharpened, and the edges of the slots serve as guides to keep the blade from slipping off the file.

Figures 6 and 7 clearly illustrate the manner of using the tool. The lawn mower 10 is placed on a table 31, preferably in the position shown. For sharpening the revolving blades 13 of the mower, the extension arm 20 is detached from the arm 15 and the file clamp 25 and file 27 are attached directly to one end of the arm 15, as in Figures 2 and 7. The arch 16 is placed over the cross bar 11, and the clamp 25 is moved either forward or backward on the arm 15 until one of the angular cross slots 30 is in position to receive one of the blades 13 and aid in maintaining the blade at the desired angle with relation to the contacting surface of the file. The outer ends of the arm 15 are then grasped by the hands and the entire tool is moved forward and backward along the blade, the cross bar 11 and the arch 16 co-operating to guide the tool in its movement. This movement is continued until the blade is in the desired condition, and the process is then repeated for each of the revolving blades.

The extension arm 20 is then attached to the arm 15, the file clamp and file are attached to one end of the arm 20, as in Figures 1 and 6, and the clamp positioned so that the stationary blade 14 of the mower enters a right angled cross slot 29. The reciprocal movement is repeated as before until the blade 14 is in the desired condition.

From this explanation and description it will be seen that I have provided a tool which is not only simple and efficient in sharpening the revolving blades of lawn mowers, but which also may be adjusted to fit different sizes and types of mowers, and which makes it possible for an operator to sharpen the stationary blade of the mower without the necessity of detaching it from the mower. The filing element is held firmly in any desired position, and may be easily and quickly replaced or reversed to expose a new surface to the blade being sharpened. It might be mentioned that the only reason for making the arm 20 in the shape illustrated is so that the arm will not contact the revolving blades of the mower during the time the stationary blade is being sharpened. It may, of course, be made in various other shapes to accomplish this same purpose.

While I have described and illustrated a specific embodiment of my invention, I am aware that numerous alterations and changes may be made in it without changing the inventive principle, and I do not wish to be limited except by previous patents and by the scope of the appended claim.

I claim:

A lawn mower sharpening tool comprising: a guide arm for mounting the tool on the cross bar of a mower and for guiding its reciprocal movement there along; a substantially S-shaped extension arm adapted to have one of its ends adjustably secured to the outer end of said guide arm the shape of said extension arm being such that its intermediate portion avoids contact with the rotary mower blades when its free end is positioned adjacent the stationary mower blade; a substantially hollow file clamp adapted to encircle a file and the outer end of either of said arms and to clamp the file and arm together in a selected position; and a blade receiving cross slot through the bottom wall of said hollow clamp, adapted to expose a portion of the plane surface of the file for the purpose of contacting a blade positioned in the slot.

BILL A. STUART.